United States Patent [19]

Kato et al.

[11] 4,410,648

[45] Oct. 18, 1983

[54] FLAME RETARDING ORGANIC HIGH POLYMER COMPOSITION

[75] Inventors: Hiroshi Kato; Chiaki Momose, both of Amagasaki, Japan

[73] Assignee: Dainichi-Nippon Cables, Ltd., Hyogo, Japan

[21] Appl. No.: 293,638

[22] PCT Filed: Dec. 25, 1980

[86] PCT No.: PCT/JP80/00325

§ 371 Date: Aug. 17, 1981

§ 102(e) Date: Aug. 17, 1981

[87] PCT Pub. No.: WO81/01852

PCT Pub. Date: Jul. 9, 1981

[30] Foreign Application Priority Data

Dec. 25, 1979 [JP] Japan .................. 54-169931

[51] Int. Cl.³ .................. C08K 5/53; C08K 5/52; C08K 5/41; C08K 5/15; C08K 5/13; C08K 5/09; C08K 5/06

[52] U.S. Cl. .................. 524/101; 524/112; 524/114; 524/127; 524/172; 524/139; 524/236; 524/285; 524/341; 524/371; 524/375; 524/377; 524/416; 524/469

[58] Field of Search .................. 260/45.7 RL, 42.33, 260/42.42, 45.8 A, 45.8 NB, 30.4 R, 30.4 A, 30.4 N, 32.4, 29.8, 469; 525/1, 2, 4, 6, 375, 386; 524/101, 112, 114, 127, 172, 139, 236, 285, 341, 371, 375, 377, 416, 469

[56] References Cited

U.S. PATENT DOCUMENTS

| | | | |
|---|---|---|---|
| 2,958,672 | 11/1960 | Goldberg | 525/375 |
| 2,965,553 | 12/1960 | Dixon et al. | 525/375 |
| 2,985,630 | 5/1961 | Price et al. | 525/386 |
| 2,989,504 | 6/1961 | Little et al. | 525/375 |
| 3,124,557 | 3/1964 | Eichhorn | 260/45.7 RL |
| 3,153,014 | 10/1964 | Fletcher et al. | 525/375 |
| 3,297,713 | 1/1967 | Ladd | 525/348 |
| 3,308,090 | 3/1967 | Falcone et al. | 260/42.42 |
| 3,329,647 | 7/1967 | Serniuk et al. | 260/42.42 |
| 3,334,075 | 8/1967 | Kehn | 525/375 |
| 3,359,193 | 12/1967 | Pinner | 525/281 |
| 3,414,551 | 12/1968 | Reid | 525/386 |
| 3,531,455 | 9/1970 | Straub | 525/375 |
| 3,984,373 | 3/1976 | Takahashi et al. | 260/45.8 NB |
| 4,116,914 | 9/1978 | Coran et al. | 260/42.42 |
| 4,129,535 | 12/1978 | Elcik | 525/1 |
| 4,129,616 | 12/1978 | Zingheim | 525/1 |
| 4,131,636 | 12/1978 | Matsumoto et al. | 525/1 |
| 4,143,029 | 3/1979 | Matthews et al. | 260/45.8 NB |
| 4,207,269 | 6/1980 | Beacham | 525/2 |
| 4,243,579 | 9/1981 | Keogh | 260/45.8 NB |
| 4,268,433 | 5/1981 | Sawatari et al. | 525/282 |
| 4,268,637 | 5/1981 | Weldy | 525/386 |
| 4,278,778 | 7/1981 | Warren | 525/348 |

FOREIGN PATENT DOCUMENTS

| | | |
|---|---|---|
| 45-30942 | 7/1970 | Japan . |
| 47-10527 | 3/1972 | Japan . |
| 48-70754 | 9/1973 | Japan . |
| 49-40340 | 4/1974 | Japan . |
| 6918756 | 6/1970 | Netherlands . |
| 829512 | 3/1960 | United Kingdom . |
| 853640 | 11/1960 | United Kingdom . |

OTHER PUBLICATIONS

Joseph Green, "New Developments in Flame Retardant Plastics and EPDM"-Fire.
Retardants: Proceedings of 1977, Int'l. Symposium on Flammability and Fire Retardants-Vijay M. Bhatnager, editor, (1977), pp. 74 to 90, Technomic Pub. Co. Inc., Westport, Connecticut.

Primary Examiner—V. P. Hoke
Attorney, Agent, or Firm—Birch, Stewart, Kolasch & Birch

[57] ABSTRACT

An organic high polymer composition having an improved flame retarding property which is obtained by incorporating into a flame resistive composition comprising (a) an organic high polymer substance, (b) an organic flame retarder and (c) incombustible active inorganic powder (d) a polyfunctional compound and (e) an organic compound represented by the formula:

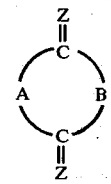

wherein Z is an oxygen atom or a sulfur atom, A is a $C_2$–$C_{20}$ divalent hydrocarbon group having or not substituents and forming a ring together with the adjacent two carbon atoms and B, and B is an oxygen atom or an amino group: —NY— (Y being a hydrogen atom, a halogen atom or an organic group having not more than 30 carbon atoms) or its hydrolyzate.

21 Claims, No Drawings

FLAME RETARDING ORGANIC HIGH POLYMER COMPOSITION

TECHNICAL FIELD

The present invention relates to organic high polymer compositions given a flame retarding property by an organic flame retardant and incombustible active inorganic powder, particularly organic high polymer compositions being greatly improved in flame retarding property.

BACKGROUND TECHNIQUE

Organic high polymers are readily made flame resistible by addition of an organic flame retardant and incombustible active inorganic powder. This method has been widely adopted in early stage for flame retarding organic high polymer substances (cf. U.S. Pat. Nos. 4,127,559; 4,132,748; etc).

As well known, it is supposed that an organic high polymer is decomposed by radical reactions at a high temperature on burning to low molecular weight combustible gases which serve as fuels for ignition and combustion of the high polymer, and at a higher temperature thereby, the generation of the decomposition gases is increased through chain reaction to continue the combustion.

The function of the flame retardant is extremely complicated, and its complete clarification is not yet attained. Supposedly, the organic flame retardant exerts an action to prevent the said chain reaction of combusting organic high polymers and an action to decrease the oxygen concentration in the atmosphere. Some of incombustible active inorganic powders act as an auxiliary for flame-resistivity, but they generally contribute to lowering the concentration of the combustible organic high polymer and, consequently, to reduce thereby the amount of the combustible gases to be generated by decomposition of the organic high polymer.

Even in the presence of such agents having the above mentioned activities, however, the decomposition rate of organic high polymers at a high temperature on burning and the generation of flammable gas can not be completely prevented. There is thus an limitation in the flame resistivity of organic high polymers by the use of these agents, and it is impossible by mere increase of the amount of such agents to obtain high degree flame resistivity of organic high polymers which is strongly required in recent years.

Under these circumstances, the present invention provides organic high polymer compositions being greatly improved in flame retarding property.

DISCLOSURE OF INVENTION

The present invention relates to an organic high polymer composition being greatly enhanced in flame retarding property which comprises a flame retarding composition containing (a) an organic high polymer, (b) an organic flame retardant and (c) incombustible active inorganic powder in a proportion of (a):(b):(c)=100:5-100:10-300 by weight and as supplemental components to be added thereto (d) a polyfunctional compound and (e) an organic compound represented by the formula:

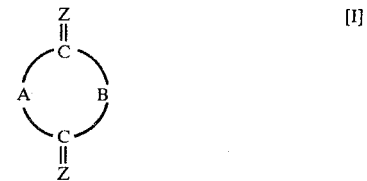

wherein Z is an oxygen atom or a sulfur atom, A is a substituted or unsubstituted $C_2$-$C_{20}$ divalent hydrocarbon group forming a ring together with the adjacent two carbon atoms and the group B, and B is an oxygen atom or an imino group: —NY— (Y being a hydrogen atom, a halogen atom or an organic group having not more than 30 carbon atoms) or its hydrolyzate, the amount of each of the supplemental components (d) and (e) being at least 0.05 part by weight to 100 parts by weight of the component (a).

In the present invention, it is essential to employ the components (d) and (e) in addition to the organic flame retardant as the component (b) and the incombustible active inorganic powder as the component (c) which have been conventionally employed. By the use of these supplemental components, the high degree flame resistivity of the component (a) can be realized.

As to the mechanism of the remarkable flame retarding effect by the use of the components (d) and (e), the present inventors have the following supposition, though it is not yet completely clarified.

As already mentioned, an organic high polymer is decomposed through a radical reaction at a high temperature to release low molecular weight combustible gas. The poly-functional compound as the component (d) forms crosslinked bridges having a ladder structure between the molecules of the organic high polymer to increase thereby the molecular weight of the organic high polymer and to prevent the production of the low molecular weight gas and, additionally, catches radicals produced at higher temperatures to terminate the chain reaction.

In the molecule of the component (e), there are present a carbon chain having an affinity or reactivity to the component (a) (the part A) and an oxygen or sulfur atom having an affinity or reactivity to the component (c) or the reaction product of the component (c) with the component (b) (the part Z). Therefore, the components (a) and (c) are combined physically or chemically together with the component (e) at a high temperature. Owing to this combination of the components (a) and (c), more effective flame resistivity can be attained in comparison with a conventional flame retarding composition wherein the component (a) and the component (c) are present separately.

In a conventional flame retarding composition, it is supposed that the component (b) makes the component (a) flame resistive at an early stage of heating and, as the result, decreases the rate of formation of combustible gases by decomposition of the component (a), consequently, to prevent rapid elevation of temperature due to combustion of the component (a). In the flame retarding composition of the invention, the component (b) is considered to exhibit a similar effect, but the reaction where the components (d) and (e) participate proceeds sufficiently at an early stage of burning of the composition of the invention to make enlarged the molecular weight of the component (a), which contributes to high degree flame resistivity.

The combined use of the components (d) and (e) affords a superior flame retarding effect in comparison with the sole use of either one of these components. This suggests the presence of an interaction between these two components.

As apparent from the flammability tests in the below mentioned working examples, the composition of the invention is charred under burning and/or forms a hard ash product being at least able to retain the skeleton. These phenomena suggest that the composition of the invention undergoes enlargement of molecular weight through the process of combustion, and this supports the above mentioned supposition about the mechanism of the remarkable flame retarding effect in the present invention.

In the present invention, a higher flame retarding effect can be obtained by the use of an organic peroxide as an additional component (f) in addition to the components (a) to (e). The component (f) causes a reaction to bind radically the component (d) pendantly to the molecular chain of the component (a) at a quite early stage of combustion. By this reaction, evaporation of the component (d) becomes difficult, in comparison with the case that the component (d) is present in a free state, even under rapid heating at a high temperature on burning of the composition of the invention, and besides, the above mentioned crosslinking function to the component (a) is enhanced effectively.

When the component (f) is employed, it is desired to subject the composition of the invention containing this component to previous heat treatment so as to complete the pendant-formation of the component (d) to the component (a). As the component (f), an usual crosslinking agent for high polymers such as polyethylene is employed. The previous heat treatment to be effected in case of the use of the component (f) may be realized, for example, under the same condition as in crossling of a polyethylene in the presence of an organic peroxide as the crosslinking agent (e.g. 150° C. for about 100 minutes; 180° C. for 20 minutes; 200° C. for about 5 minutes).

As the component (a) in the composition of the invention, there may be employed various organic high polymeric substances which have been usually subjected to flame retarding treatment by by combined use of an organic flame retardant and an incombustible active inorganic powder. Examples of such high polymeric substances are rubbers and plastics usually classified into hydrocarbons (e.g. polyethylene, polypropylene, polybutene-1, poly-4-methylpentene-1, ethylene-propylene copolymer, ethylene-proylene-diene terpolymer, ethylene-vinyl acetate copolymer, ethylene-ethyl acrylate copolymer, styrenebutadiene copolymer, polyisobutylene, butyl rubbers, natural rubbers, isoprene-isobutylene copolymer, 1,4- or 1,2-polybutadiene, polystyrene), rubbers and plastics containing hetero atoms such as halogens, oxygen, and nitrogen (e.g. polyvinyl chloride, chlorinated polyethylene, polychloroprene, chlorosulfonated polyethylene, fluorine rubbers, acrylonitrile-butadiene copolymer, chlorohydrin rubber, chlorohydrin-ethylene oxide copolymer, acrylonitrile-butadiene-styrene copolymer, polyacetal), etc. Among them, particularly preferred are ethylene-propylene-diene terpolymer, ethylene-propylene copolymer, polyethylene, ethylene-vinyl acetate copolymer, chlorosulfonated polyethylene, chlorinated polyethylene and other organic high polymers being able to be crosslinked by organic peroxide and chlorine-containing organic high polymers such as polyvinyl chloride, polychloroprene and chlorohydrin rubber.

As understood from the object of the invention to improve conventional flame retarding techniques with known flame retardants or from the above mentioned mechanism of flame resistivity in the composition of the invention, conventional substances may be employed for the organic flame retardants as the component (b) and for the incombustible active inorganic powder as the component (c). Preferred examples of the components (b) and (c) are shown in the following.

Component (b):

(1) Halogen-containing organic flame retardants: especially the ones which are decomposed markedly at a temperature of 300° to 800° C., release a hydrogen halide by decomposition and show a halogen content of at least 20% by weight in the molecule;

(2) Halogen-containing phosphorus organic flame retardants: especially the ones which are decomposed markedly at a temperature of 300° to 800° C. show a halogen content of at least 15% by weight in the molecule and a phosphorus content of at least 3% by weight in the molecule;

(3) Phosphorus-containing organic flame retardants: especially the ones which are decomposed markedly at a temperature of 300° to 800° C., show a phosphorus content of at least 4% by weight in the molecule and contain at least two oxygen atom in the molecule.

Specific examples are as follows:

(1) Halogen-containing organic flame retardants:

(a) Aliphatic organic bromine compounds such as tris(2,3-dibromopropyl)isocyanurate, 2,3-dibromopropyl methacrylate, hexabromocyclododecane, tribromoallyl ether, pentabromoallyl ether, tetrabromobutane, bromotrichloromethane, pentabromochlorocyclohexanone, epibromohydrin and tribromoneopentyl alcohol.

(b) Aromatic organic bromine compounds such as pentabromotoluene, decabromobiphenyl, decabromodiphenyl ether, pentabromodiphenyl ether, tetrabromobisphenol S, tetrabromobisphenol A derivatives, 2,2'-bis(4-hydroxy-3,5-dibromophenyl)propane, 2,2'-bis(4-hydroxyethoxy-3,5-dibromophenyl)propane, hexabromobiphenyl, hexabromobenzene, hexabromodiphenyl ether, pentabromophenol, pentabromoethylbenzene, tetrabromophthalic anhydride, tribromoaniline, tribromophenol, bis(4-hydroxyethoxy-3,5-dibromophenyl)sulfone and 2,2-bis[4-(2,3-dibromopropoxy)-3,5-dibromophenyl]propane.

(c) Polymeric bromine compounds such as brominated polybutadiene, brominated poly-p-vinylphenol and brominated epoxy resins having a melting point of 50°-120° C.

(d) Organic chlorine compounds such as chlorinated paraffins (especially having a chlorine content of 35 to 75% by weight), chlorinated polyolefins (especially having a chlorine content of 50% by weight), dimethyl chlorendate, commercially available chlorinated polycyclic aliphatic compounds (e.g. Dechloran 602, Dechloran 604, Dechloranplus 25 (manufactured by USA Hooker Chemicals and Plastics Corp.)) and tetrachlorophthalic anhydride.

(2) Halogen-containing phosphorus organic flame retardants:

(a) Organic bromine phosphorus compounds such as bis(2,3-dibromopropyl)dichloropropyl phosphate, tris(2-bromo-3-chloropropyl)phosphate, tris(bromocresyl)phosphate, tris(2-chloro-2'-bromoisopropyl)phosphate, 2-bromoethyldiethyl phosphate, tris(tribromophenyl)phosphate, ethylenebis[tris(2-cyanoethyl)phosphonium]bromide and brominated alkyl acid phosphate.

(b) Organic chlorine phosphorus compounds such as tris(chloroethyl)phosphate, tris(monochloropropyl)phosphate, phenylbis(monochloropropyl)phosphate, tris(dichloropropyl)phosphate, phenylphosphonic acid chloride, phosphorus and chlorine-containing oligomers and commercially available products (e.g. Sumigard 705, 707, 801 manufactured by Sumitomo Kagaku Co., Ltd.; EXN-530 manufactured by Ipposha Yushi Co., Ltd.; Phosgard, C-22-R manufactured by Monsanto Corp.; Pyroset RTK manufactured by American Cyanamid Corp.; Fyrol FR-2 manufactured by Stauffer Chemical Corp.).

(3) Phosphorus-containing organic flame retardants: di(polyoxyethylene)hydroxymethyl phosphonate, ammonium polyphosphate, diethoxybis(2-hydroxyethyl)aminomethyl phosphonate, phenylphosphonic acid, etc.

Particularly preferred as the component (b) are bromine- or bromine and phosphorus-containing organic flame retardants such as tris(2,3-dibromopropyl)isocyanurate, decabromobiphenyl, decabromodiphenyl ether, tetrabromobisphenol A derivatives, tetrabromobisphenol S, bis(2,3-dibromopropyl)dichloropropyl phosphate, tris(2-bromo-3-chloropropyl)phosphate, tris(bromocresyl)phosphate, brominated alkyl acid phosphate, tris(chloroethyl)phosphate, tris(monochloropropyl)phosphate, di(polyoxyethylene)hydroxymethyl phosphonate and diethoxybis(2-hydroxyethyl)aminomethyl phosphonate. Among them, decabromobiphenyl, decabromodiphenyl ether and tetrabromobisphenol S are the most preferable.

As the component (c), there may be employed (1) inorganic fireproofing agents and (2) inorganic fillers. This classification is made merely for convenience, and there is no strict distinction between the two groups. Examples of the inorganic fireproofing agents (1) are metal compounds and complexes containing metals belonging to the group V in the periodic table (e.g. As, Sb, Bi) and other metals (e.g. Zn, Co, B, Zr, Sn, Ti, Al, Mg. Ca, Fe) such as antimony compounds (e.g. $Sb_2O_3$, $Sb_2O_5$), zirconium compounds (e.g. zirconium silicate), molybdenum compounds (e.g. $ZnO.Zn.MoO_4$, $CaO.Zn.MoO_4$, $Zn.MoO_3.CaSO_4$), $NaAl(OH)_2CO_3$ (dawsonite), $NaAl(OH)_2CO_3$, $Al(OH)_3$, $NaCO_3.2H_2O$, $Mg(OH)_2$, $3ZnO.2B_2O_3.3H_2O$, $2ZnO.3B_2O_3.3\frac{1}{2}H_2O$, borax, anhydrous aluminum oxide, aluminum hydroxide, $ZnBO_3$, $ZnO$, $ZnCO_3$, $CaO$, $Fe(OH)_3$, $SnSO_4$, $CO_3(PO_4)_2.8H_2O$, $MgCO_3$, $MgO$, $Na_2B_4O_7.10H_2O$, $6CaO.6SiO_2.H_2O$, $Al(OH)_3.NaHCO_3$, $Al(OH)_3.MgCO_3$, basic magnesium carbonate, $Ca(OH)_2$, $TiO_2$ and metastannic acid. Examples of the inorganic fillers (2) are clays such as soft clay, hard clay, Dixie clay, calcined clay, kaolin clay, and feldspar powder (aluminum silicate compounds), talcs such as mistron vapor talc, crown talc, talc SC and talc SW (magnesium silicate compounds), calcium carbonates such as light calcium carbonate, heavy calcium carbonate and surface coated calcium carbonate, silicas, diatomaceous earth, mica powder, siliceous sand, slate powder, asbestos, barium sulfate, aluminum sulfate, calcium sulfate, molybdenum disulfide, black lead, potassium titanate, glass powder, etc. Among them, $Sb_2O_3$, $MgCO_3$, $Mg(OH)_2$, metastannic acid, $Al(OH)_3$ and basic magnesium carbonate in the group (1) and talcs and clays in the group (2) are preferable. Particularly, Mg-containing inorganic powdery substances such as $MgCO_3$, $Mg(OH)_2$, basic magnesium carbonate and talcs are desirable.

The above mentioned substances as the components (a), (b) and (c) are all well-known substances. In addition to them, various other substances are also employable. For example, detailed description is made about these components in "Frame Retardancy of Polymeric Materials" Vols. 1–5 (1973) (edit. by Kuryla et al; published by Marcel Decker Corp.), and appropriate substances may be selected therefrom for the use in the invention.

The polyfunctional compound as the component (d) means a compound having at least two groups containing a reactive carbon-carbon double bond in the molecule. There are included at least bi-functional, preferable bi- to tetrafunctional aromatic, aliphatic and alicyclic compounds and metal-containing compounds. The ones having a molecular weight of 50–100,000, particularly 100–10,000 are desirable. Specific examples are as follows:

(1) Aromatic polyfunctional compounds: divinylbenzene, diallyl phthalate, diallyl isophthalate, 4,4'-isopropylidene diphenol bis(diethylene glycol methacrylate) ether, triallyl trimellitate, 2,2'-bis(4-acryloxydiethoxyphenyl)propane, etc.

(2) Aliphatic polyfunctional compounds: syn-1,2-polybutadiene, 1,4-butylene dimethacrylate, 1,4-buthanediol diacrylate, pentaerythritol triacrylate, N,N-methylenebisacrylamide, ethylene glycol dimethacrylate, neopentyl glycol dimethacrylate, 1,3-butylene glycol dimethacrylate, polyethylene glycol dimethacrylate, trimethylolpropane trimethacrylate, pentaerythritol tetramethacrylate, 1,6-hexanediol diacrylate, trimethylolpropane triacrylate, diethyleneglycol dimethacrylate, triethylene glycol dimethacrylate, dipropylene glycol dimethacrylate, polyethylene glycol diacrylate, 1,6-hexanediol dimethacrylate, tetraethylene glycol dimethacrylate, etc.

(3) Aliphatic polyfunctional cyclic compounds: triallyl isocyanurate, triallyl cyanurate, triacryloylhexahydro-1,3,5-triazine, diallyl chlorendate, etc.

(4) Metal-containing polyfunctional compounds: aluminum acrylate, aluminum methacrylate, zinc methacrylate, zinc acrylate, magnesium methacrylate, magnesium acrylate, calcium methacrylate, calcium acrylate, zirconium acrylate, zirconium methacrylate, etc.

Among these polyfunctional compounds, nitrogen-containing polyfunctional cyclic compounds such as triallyl isocyanurate, triacryloylhexahydro-1,3,5-triazine and triallyl cyanurate are the most preferable.

As the component (e), there may be employed compounds [I] comprising acid anhydrides of the formula [IA]:

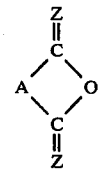

[IA]

wherein A and Z are as defined above and acid imides of the formula [IB]:

wherein A, Y and Z are as defined above, and their hydrolyzates. Particularly preferred are the compound of the formula:

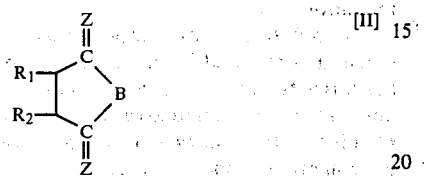

wherein $R_1$ and $R_2$ are each a hydrogen atom, a halogen atom or an organic group having not more than 30 carbon atoms, and B and Z are as defined above, and its hydrolyzates.

The divalent hydrocarbon group represented by the symbol A in the formula [I] may be saturated or unsaturated and may have appropriate substituents. In the latter case, it is desired that the sum of the number of carbon atoms constituting the group A (2-20) and the number of carbon atoms of organic groups contained therein as substituents is 50 or less. Examples of such substituents are alkyl groups, alkoxy groups, carboxyl groups, amino groups, acyl groups, etc. When the number of carbon atoms constituting the group A is 2, a single ring or multiple rings (including a condensed ring) may be formed by the linkage of these carbon atoms together with the carbon atoms of substituents. Such rings may bear the above mentioned substituents.

The symbol Y in the formula [I] or [IB] means an organic group having 30 or less carbon atoms such as alkyl, alkoxy, carboxy, amino or acyl or a hydrogen or halogen atom. There may be also employed as the component (e) a compound containing at least two of the portion in the formula [IA]:

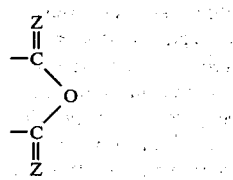

and/or the portion in the formula [IB]:

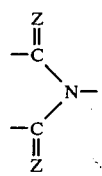

Therefore, at least the following compounds are included in the compound [I]:

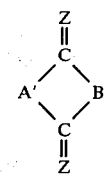

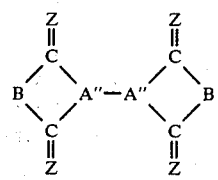

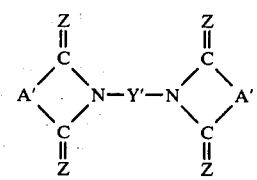

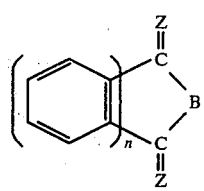

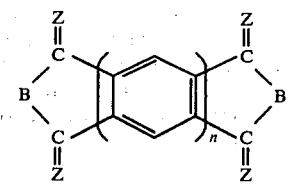

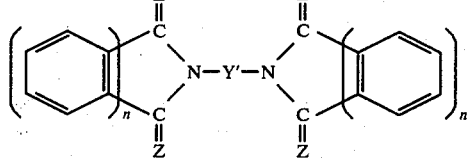

wherein A' is a substituted or unsubstituted divalent hydrocarbon group having a straight chain of 2-20 carbon atoms, A" is a substituted or unsubstituted trivalent hydrocarbon group having a straight chain of 2-20 carbon atoms, Y' is a divalent hydrocarbon group having a straight chain of not larger than 20 carbon atoms, n is an integer of 1 to 3, and B and Z are as defined above, and benzene rings may bear substituents.

Specific examples of the compound [I] are mono- and polyimides such as succinimide, pyromellitimide, N,N'-m-phenylenebismaleimide, N-(cyclohexylthio)phthalimide, glutarimide, N-bromophthalimide, 4-nitrophthalimide, phthalimide, N-n-butylphthalimide, N-benzylphthalimide, 2-pyridylphthalimide, N-hydroxymethylphthalimide, N-phenylsuccinimide, β-bromoethylphthalimide, diethylphthalimide malonate and maleic terpinene imide, acid anhydrides such as terpinene maleic anhydride, pyromellitic anhydride, phthalic anhydride and maleic anhydride, etc. Among them, N,N'-m-phenylenebismaleimide, phthalic anhydride, maleic anhydride, terpiene maleic anhydride, maleic terpinene imide and N-(cyclohexylthio)phthalimide are the most preferable.

There may be also employed as the component (e) hydrolyzates of the compound [I], i.e. dicarboxylic acids derived from the acid anhydride [IA] and acid amides derived from the imide [IB]. These hydrolyzates may be prepared by hydrolysis of the acid anhydride [IA] or the imide [IB] or by other appropriate procedures.

As the component (f), there may be employed any conventional crosslinking agent for polyolefin rubbers and plastics such as polyethylene and ethylene-propylene copolymers. Examples of such crosslinking agent are t-butylhydroperoxide, cumene hydroperoxide, di-t-butyl peroxide, t-butylcumyl peroxide, di-cumyl peroxide, 2,5-dimethyl-2,5-di(t-butylperoxy)hexane, 2,5-dimethyl,2,5-di(t-butylperoxy)hexine-3,1,3-bis(t-butyl-peroxy-isopropyl)benzene, 1,1-bis(t-butylperoxy)-3,3,5-trimethylcyclohexane, n-butyl-4,4-bis(t-butylperoxy)-valerate, dibenzoyl peroxide, p-chlorobenzoyl peroxide, 2,4-dichlorobenzoyl peroxide, t-butyl peroxybenzoate, t-butylperoxyisopropyl carbonate, t-butyl perbenzoate, etc. Among them, dicumyl peroxide and 1,3-bis(t-butylperoxyisopropyl)benzene are particularly preferred.

The amount of each of the components to be used in the invention is as follows: component (a), 100 parts by weight; component (b), 5-100 parts by weight, preferably 10-40 parts by weight; component (c), 10-300 parts by weight, preferably 30-100 parts by weight; component (d), 0.05-20 parts by weight, preferably 0.1-5 parts by weight; component (e), 0.05-15 parts by weight, preferably 0.1-5 parts by weight; component (f) is used, 0.3-20 parts by weight, preferably 1-3 parts by weight. When the amounts of the components are smaller that the said lower limites, sufficient flame retarding property can not be obtained. When the amounts exceed the said upper limits, the characteristic properties inherent to the component (a) are remarkably deteriorated.

In the composition of the invention, the crosslinking and vulcanization of the component (a) may be effected by the use of a conventional crosslinking or vulcanizing agent for organic high polymers or by irradiation. When an organic high polymer being able to be crosslinked by the component (f) is used as the component (a), and the above mentioned heat treatment is effected under the combined use of the component (f), crosslinking of the component (a) by the component (f) is caused at the same time, but such crosslinking reaction has no influence upon the flame retarding property of the composition of the invention. When the organic high polymer as the component (a) is the one being able to be crosslinked and vulcanized by an agent other than the component (f), the crosslinking and vulcanization may be effected by the sole use of a conventional agent useful as the crosslinking or vulcanizing agent for the component (a) or by the combined use together with the component (f).

The composition of the invention may also contain, according to necessity, other additives usually employed in rubber and plastic industries such as carbon black, wax, higher fatty acids, pigments, process oils, lubricants, foaming agents, stabilizers, retarders, vulcanization-accelerators and tackifiers. The composition of the invention containing such usual additives may be readily prepared by the use of a conventional mixing methods or apparatus such as a roll mill, a kneader or a Bumbury's mixer. The crosslinking and vulcanization may be also effected by a conventional procedure usually adopted in rubber and plastic industries. In preparing the composition of the invention, there is no particular limitation in the order of mixing of the essential and optional components, and the mixing may be effected appropriately according to the technical practice in the art. Irrespective of the mixing order, therefore, the obtained composition should be considered to be in the scope of the invention, as far as all of the essential components of the invention are contained and the object or effect of flame resistivity is attained or obtained.

Since the composition of the invention is able to be crosslinked and vulcanized and possesses an excellent flame retarding property, it can be used for various purposes in which flame retarding property is required. Especially, it is the most suitable for coating of electric wire cables and as materials for hoses, pipes, sheets, films, tapes, fibers and various profiles.

BEST FORM FOR EMBODIMENT OF INVENTION

The present invention will be hereinafter explained further in detail by the following Examples and Comparative Examples which are not intended to limit the scope of the invention and in which % and part(s) are by weight. The substances used as components in these Examples are numbered and shown collectively in Table 1. The names of the substances numerically shown in Tables 2 to 4 can be known by referring to Table 1.

TABLE 1

| Component | No. | Name of substance |
|---|---|---|
| b | 1 | Decabromodiphenyl |
|  | 2 | Tetrabromobisphenol S |
|  | 3 | Decabromodiphenyl ether |
|  | 4 | Tetrabromophthalic anhydride |
|  | 5 | Chlorinated paraffin (chlorine content 70%) |
|  | 6 | Dimethyl chlorendate |
|  | 7 | Tris(2,3-dibromopropyl) isocyanurate |
|  | 8 | Bis(2,3-dibromopropyl)dichloropropyl phosphate |
|  | 9 | Tris(bromocresyl) phosphate |
|  | 10 | Tris(2-bromo-3-chloropropyl) phosphate |
|  | 11 | Tris(monochloropropyl) phosphate |
|  | 12 | Tris(chloroethylphosphate) |
|  | 13 | Di(polyoxyethylene)hydroxymethyl phosphate |
|  | 14 | Diethoxybis(2-hydroxyethyl)aminomethyl phosphate |
| c | 21 | Antimony trioxide |
|  | 22 | Metastannic acid |
|  | 23 | Hydrated magnesia |
|  | 24 | Magnesium carbonate |
|  | 25 | $ZnO \cdot ZnMoO_3$ |
|  | 26 | Hydrated alumina |
|  | 27 | Dixie clay |
|  | 28 | Kaolin clay |
|  | 29 | Calcined clay |
|  | 30 | Talc SC |
|  | 31 | mistron Mistron talc |
|  | 32 | Silicic anhydride |
|  | 33 | Diatomaceous earth |
|  | 34 | Synthetic gypsum |
| d | 41 | Divinylbenzene |
|  | 42 | Triallyl trimellitate |
|  | 43 | N,N'—Methylenebisacrylamide |
|  | 44 | Pentaerythritol trimethyacrylate |
|  | 45 | Neopentylglycol dimethacrylate |
|  | 46 | Triallyl cyanurate |
|  | 47 | Triallyl isocyanurate |
|  | 48 | Triacryloylhexahydro-1,3,5-triazine |
|  | 49 | Aluminum methacrylate |
|  | 50 | Magnesium methacrylate |
| e | 51 | Meleic terpinene imide |

TABLE 1-continued

| Component | No. | Name of substance |
|---|---|---|
|  | 52 | N—(Cyclohexylthio)phthalimide |
|  | 53 | N—Benzylphthalimide |
|  | 54 | N,N'—m-Phenylenebismaleimide |
|  | 55 | Maleic anhydride |
|  | 56 | Terpinene maleic anhydride |
|  | 57 | Phthalic anhydride |
| f | 61 | Dicumyl peroxide |
|  | 62 | 1,3-Bis(t-butylperoxyisopropyl)benzene |

EXAMPLES 1–15 AND COMPARATIVE EXAMPLES 1–3

As the resin base material, ethylene-propylenediene terpolymer (EPDM) ("JSR EP-21" manufactured by Japan Synthetic Rubber Co., Ltd.) is employed. The following basic composition (A) and the components shown in Table 2 are admixed by a roll mill to prepare compositions of invention and comparative compositions.

Basic composition A:
EPDM: 100 parts
Zinc oxide: 10 parts
2-Mercaptobenzothiazole: 2 parts
Stearic acid: 1 part The thus obtained composition is press-cured at 165° C. for 30 minutes to prepare a vulcanizate sample having a thickness of 3.0±0.5 mm, a width of 6.5±0.5 mm and a length of 100 mm. The flame retarding property of this sample is determined by the oxygen index method (JIS K 7201-1976). The results are shown in Table 2. The case in which formation of char or of hard ash product at least being able to maintain its skeleton is observed by combustion in this flammability test is indicated by the symbol O in the column of remarks. The case in which such formation is not observed is indicated by the symbol X.

EXAMPLES 16–19

As the resin base material, ethylene-propylene copolymer rubber ("JSR EP-11" manufactured by Japan Synthetic Rubber Co., Ltd.) is employed. The following components are admixed by a roll mill to prepare a basic composition (Basic Composition B):

Basic composition B:
Ethylene-propylene copolymer rubber: 100 parts
Zinc oxide: 10 parts
2-Mercaptobenzothiazole: 2 parts
Stearic acid: 1 part To the basic composition B, the components shown in Table 2 are added, and the mixture is admixed by a roll mill and then press-cured as in Example 1–15 to prepare a vulcanizate sample. The results of the flammability test are shown in Table 2.

TABLE 2

|  |  | Comparative Example No. | | | Example No. | | | | | | | | |
|---|---|---|---|---|---|---|---|---|---|---|---|---|---|
|  |  | 1 | 2 | 3 | 1 | 2 | 3 | 4 | 5 | 6 | 7 | 8 | 9 |
| Basic composition |  | A | A | A | A | A | A | A | A | A | A | A | A |
| Component (b) | Kind | 5 | 5 | 5 | 2 | 3 | 3 | 1 | 2 | 3 | 2 | 3 | 3 |
|  | Amount (part) | 30 | 30 | 30 | 30 | 20 | 30 | 30 | 30 | 30 | 30 | 30 | 30 |
|  | Kind |  |  |  |  |  |  |  |  |  |  |  |  |
|  | Amount (part) |  |  |  |  |  |  |  |  |  |  |  |  |
|  | Kind |  |  |  |  |  |  |  |  |  |  |  |  |
|  | Amount (part) |  |  |  |  |  |  |  |  |  |  |  |  |
|  | Kind |  |  |  |  |  |  |  |  |  |  |  |  |
|  | Amount (part) |  |  |  |  |  |  |  |  |  |  |  |  |
| Component (c) | Kind | 21 | 21 | 21 | 23 | 21 | 22 | 21 | 22 | 23 | 23 | 21 | 21 |
|  | Amount (part) | 10 | 20 | 10 | 10 | 10 | 10 | 10 | 10 | 10 | 10 | 10 | 5 |
|  | Kind | 27 | 28 | 24 | 31 | 27 | 24 | 23 | 27 | 30 | 31 | 33 | 25 |
|  | Amount (part) | 50 | 50 | 70 | 60 | 60 | 30 | 10 | 60 | 60 | 60 | 60 | 60 |
|  | Kind |  |  |  |  |  | 31 | 24 |  |  |  |  | 26 |
|  | Amount (part) |  |  |  |  |  | 30 | 20 |  |  |  |  | 5 |
|  | Kind |  |  |  |  |  |  | 28 |  |  |  |  |  |
|  | Amount (part) |  |  |  |  |  |  | 20 |  |  |  |  |  |
|  | Kind |  |  |  |  |  |  | 30 |  |  |  |  |  |
|  | Amount (part) |  |  |  |  |  |  | 20 |  |  |  |  |  |
| Component (d) | Kind |  |  |  | 46 | 21 | 47 | 46 | 48 | 47 | 47 | 47 | 47 |
|  | Amount (part) |  |  |  | 1 | 2 | 1 | 0.5 | 1 | 0.5 | 0.5 | 1 | 1 |
|  | Kind |  |  |  |  |  |  |  |  |  |  |  |  |
|  | Amount (part) |  |  |  |  |  |  |  |  |  |  |  |  |
|  | Kind |  |  |  |  |  |  |  |  |  |  |  |  |
|  | Amount (part) |  |  |  |  |  |  |  |  |  |  |  |  |
| Component (e) | Kind |  |  |  | 52 | 52 | 55 | 54 | 54 | 56 | 56 | 57 | 57 |
|  | Amount (part) |  |  |  | 0.5 | 1 | 1 | 1 | 0.5 | 1 | 0.5 | 0.5 | 1 |
|  | Kind |  |  |  |  |  |  |  |  |  |  |  |  |
|  | Amount (part) |  |  |  |  |  |  |  |  |  |  |  |  |

TABLE 2-continued

|  | Kind Amount (part) |  |  |  |  |  |  |  |  |  |  |  |
|---|---|---|---|---|---|---|---|---|---|---|---|---|
| Component (f) | Kind | 61 | 61 | 61 | 61 | 61 | 61 | 62 | 62 | 61 | 61 | 61 | 61 |
|  | Amount (part) | 2.5 | 2.5 | 2.5 | 2.7 | 2.7 | 2.7 | 2.7 | 2.7 | 2.5 | 2.5 | 3.0 | 3.5 |
| Flame retarding property |  | 22.5 | 22 | 23.5 | 36 | 30 | 34 | 28 | 30 | 29 | 37 | 35 | 27 |
| Remarks |  | X | X | X | O | O | O | O | O | O | O | O | O |

|  |  | Example No. |  |  |  |  |  |  |  |  |  |
|---|---|---|---|---|---|---|---|---|---|---|---|
|  |  | 10 | 11 | 12 | 13 | 14 | 15 | 16 | 17 | 18 | 19 |
| Basic composition |  | A | A | A | A | A | A | B | B | B | B |
| Component (b) | Kind | 3 | 3 | 2 | 3 | 3 | 3 | 3 | 2 | 3 | 4 |
|  | Amount (part) | 30 | 30 | 20 | 20 | 20 | 20 | 10 | 20 | 20 | 20 |
|  | Kind |  |  | 4 | 5 | 6 | 7 | 1 | 7 | 8 | 10 |
|  | Amount (part) |  |  | 10 | 5 | 5 | 5 | 20 | 5 | 5 | 5 |
|  | Kind |  |  |  | 8 | 9 | 11 | 5 | 13 | 12 | 14 |
|  | Amount (part) |  |  |  | 5 | 5 | 5 | 5 | 5 | 5 | 5 |
|  | Kind |  |  |  |  |  | 13 |  |  |  |  |
|  | Amount (part) |  |  |  |  |  | 5 |  |  |  |  |
| Component (c) | Kind | 21 | 21 | 21 | 21 | 21 | 21 | 21 | 21 | 21 | 21 |
|  | Amount (part) | 10 | 10 | 10 | 10 | 10 | 10 | 10 | 10 | 10 | 10 |
|  | Kind | 32 | 31 | 31 | 22 | 31 | 31 | 22 | 24 | 24 | 26 |
|  | Amount (part) | 40 | 30 | 30 | 5 | 30 | 30 | 5 | 20 | 20 | 20 |
|  | Kind |  | 26 | 29 | 25 | 33 | 28 | 26 | 31 | 28 | 28 |
|  | Amount (part) |  | 20 | 30 | 30 | 30 | 30 | 10 | 30 | 60 | 50 |
|  | Kind |  | 34 |  | 31 |  |  | 31 | 27 | 32 | 34 |
|  | Amount (part) |  | 10 |  | 30 |  |  | 60 | 30 | 30 | 20 |
|  | Kind |  |  |  |  |  |  |  |  |  |  |
|  | Amount (part) |  |  |  |  |  |  |  |  |  |  |
| Component (d) | Kind | 47 | 47 | 47 | 42 | 43 | 43 | 41 | 42 | 43 | 45 |
|  | Amount (part) | 1 | 1 | 2 | 0.5 | 0.5 | 0.5 | 1 | 1 | 1 | 1 |
|  | Kind |  |  |  | 44 | 48 | 45 | 46 | 48 | 49 | 50 |
|  | Amount (part) |  |  |  | 0.5 | 0.5 | 0.5 | 0.5 | 0.5 | 0.5 | 0.5 |
|  | Kind |  |  |  | 49 | 49 | 50 |  |  |  |  |
|  | Amount (part) |  |  |  | 1.0 | 0.5 | 1.0 |  |  |  |  |
| Component (e) | Kind | 56 | 56 | 56 | 53 | 51 | 52 | 51 | 53 | 54 | 54 |
|  | Amount (part) | 0.5 | 1 | 1.5 | 0.5 | 0.5 | 0.5 | 0.5 | 0.5 | 0.5 | 0.5 |
|  | Kind |  |  |  | 57 | 53 | 54 | 54 | 54 | 55 | 57 |
|  | Amount (part) |  |  |  | 0.5 | 0.5 | 0.5 | 0.5 | 0.5 | 0.5 | 1.0 |
|  | Kind |  |  |  |  | 57 |  |  |  |  |  |
|  | Amount (part) |  |  |  |  | 0.5 |  |  |  |  |  |
| Component (f) | Kind | 61 | 61 | 61 | 61 | 61 | 61 | 61 | 61 | 62 | 62 |
|  | Amount (part) | 2.5 | 2.5 | 2.5 | 2.5 | 4.0 | 4.0 | 2.5 | 2.5 | 2.5 | 3.0 |
| Flame retarding property |  | 30 | 29 | 33 | 31 | 29 | 33 | 28 | 29 | 29 | 30 |
| Remarks |  | O | O | O | O | O | O | O | O | O | O |

EXAMPLES 20 AND 21 AND COMPARATIVE EXAMPLE 4

As the resin base material, low density polyethylene ("Yukalon HE 30" manufactured by Mitsubishi Petrochemical Co., Ltd.) is employed. The following components are admixed by a roll mill at 105° to 115° C. to prepare a basic composition (Basic Composition C).

Basic composition C:
Low density polyethylene: 100 parts
4,4'-Thiobis(3-methyl-6-t-butylphenol): 0.3 part
Stearic acid: 1.0 part To the basic composition C, the components shown in Table 3 are added, and the mixture is mixed by a roll mill and then press-cured at 175° C. for 30 minutes to obtain a sample having the same shape as in Examples 1 to 15. The results of the flammability test are shown in Table 3.

EXAMPLES 22 AND 23

As the base resin material, ethylene-vinyl acetate copolymer ("Evatate D-2021" manufactured by Mitsubishi Petrochemical Co., Ltd.; vinyl acetate content, 10%) is employed. The following components are admixed by a roll mill at 105° to 115° C. to prepare a basic composition (Basic Composition D):
Basic composition D:
Ethylene-vinyl acetate copolymer: 100 parts
2-Mercaptobenzothiazole: 2 parts
Stearic acid: 1 part To the basic composition D, the components shown in Table 3 are added, and the mixture is admixed by a roll mill and then press-cured at 175° C. for 30 minutes to obtain a sample having the same shapes as in Examples 1 to 15. The results of the flammability test are shown in Table 3.

EXAMPLE 24

As the resin base material, polypropylene ("Norbrene" manufactured by Mitsubishi Petrochemical Co., Ltd.) is employed. The following components are admixed by a roll mill at 145° to 160° C. to prepare a basic composition (Basic Composition E):
Basic Composition E:
Polypropylene: 100 parts
Stearic acid: 1 part
Antioxidant (4,4'-thiobis(3-methyl-6-t-butylphenol)): 0.3 part To the basic composition E, the components shown in Table 3 are added, and the mixture is admixed by a roll mill and press-cured at 170° C. for 20 minutes to obtain a sample having the same shape as in Examples 1 to 15. The results of the flammability test are shown in Table 3.

EXAMPLES 25 AND 26

As the resin base material, high density polyethylene ("Staflen 630" manufactured by Furukawa Chemical Industry Co., Ltd.; density, 0.959; melt index, 3.5) is employed. The following components are admixed by a roll mill at 145° to 160° C. to prepare a basic composition (Basic Composition F):
Basic Composition F:
High density polyethylene: 100 parts
Stearic acid: 1 part
Antioxidant (4,4'-thiobis(3-methyl-6t-butylphenol)): 0.3 part To the basic composition F, components shown in Table 3 are added, and the mixture is mixed by a roll mill and then press-cured at 140° to 155° C. for 30 minutes to obtain a sample having the same shape as in Examples 1 to 15. The results of the flammability test are shown in Table 3.

EXAMPLE 27

As the resin base material, ethylene-ethyl acrylate copolymer ("DPDJ-6169" manufactured by Nihon Yunika Co., Ltd.; melt index, 6; density, 0.93) is employed. The following components are admixed by a roll mill at 105° to 115° C. to prepare a basic composition (Basic Composition G):
Basic Composition G:
Ethylene-ethyl acrylate copolymer: 100 parts
2-Mercaptobenzothiazole: 2 parts
Stearic acid: 1 part To the basic composition G, the components shown in Table 3 are added, and the mixture is mixed by a roll mill and then press-cured at 175° C. for 30 minutes to obtain a sample having the same shape as in Examples 1 to 15. The results of the flammability test are shown in Table 3.

EXAMPLES 28 AND 29

As the resin base material, polyvinyl chloride ("Vinica 37H" manufactured by Nippon Zeon Co., Ltd.) is employed. The following components are admixed by a roll mill at 160° to 170° C. to prepare a basic composition (Basic Composition H):
Basic Composition H:
Vinyl chloride: 100 parts
n-Trioctyl trimellitate: 45 parts
Stabilizer (dibutyl tin dilaurate): 4 parts
Stabilizer (dibasic lead stearate): 1 part
Stearic acid: 1 part To the basic composition H, the components shown in Table 3 are added, and the mixture is mixed by a roll mill of 160°–170° C. and then press-cured at 175° C. for 20 minutes to obtain a sample having the same shape as in Examples 1 to 15. The results of the flammability test are shown in Table 3.

TABLE 3

| | | Comparative Example No. 4 | Example No. 20 | 21 | 22 | 23 | 24 | 25 | 26 | 27 | 28 | 29 |
|---|---|---|---|---|---|---|---|---|---|---|---|---|
| Basic composition | | C | C | C | D | D | E | F | F | G | H | H |
| Component (b) | Kind | 5 | 3 | 3 | 3 | 2 | 4 | 3 | 3 | 1 | 2 | 3 |
| | Amount (part) | 30 | 30 | 10 | 10 | 10 | 30 | 30 | 20 | 10 | 20 | 5 |
| | Kind | | | 4 | 4 | 4 | 13 | | 4 | 2 | 4 | 4 |
| | Amount (part) | | | 20 | 20 | 20 | 5 | | 10 | 10 | 20 | 20 |
| | Kind | | | | | | | | | 4 | | 10 |
| | Amount (part) | | | | | | | | | 20 | | 5 |
| | Kind | | | | | | | | | 27 | 27 | 27 |
| | Amount (part) | | | | | | | | | 1.0 | 0.5 | 0.5 |
| Component (c) | Kind | 21 | 21 | 21 | 21 | 21 | 21 | 21 | 21 | 21 | 21 | 21 |
| | Amount (part) | 10 | 10 | 10 | 10 | 5 | 10 | 10 | 10 | 10 | 10 | 10 |
| | Kind | 31 | 31 | 22 | 23 | 22 | 26 | 26 | 26 | 25 | 24 | 23 |
| | Amount (part) | 30 | 30 | 5 | 5 | 5 | 10 | 5 | 5 | 5 | 10 | 5 |
| | Kind | | | 31 | 31 | 31 | 31 | 31 | 31 | 31 | 31 | 31 |
| | Amount (part) | | | 30 | 15 | 45 | 20 | 30 | 25 | 30 | 25 | 26 |
| | Kind | | | | | | | | | | 29 | 29 |
| | Amount | | | | | | | | | | 10 | 10 |

TABLE 3-continued

| | | Comparative Example No. 4 | Example No. 20 | 21 | 22 | 23 | 24 | 25 | 26 | 27 | 28 | 29 |
|---|---|---|---|---|---|---|---|---|---|---|---|---|
| | (part) | | | | | | | | | | | |
| | Kind | | | | | | | | | | | |
| | Amount (part) | | | | | | | | | | | |
| Component (d) | Kind | | 41 | 42 | 45 | 47 | 41 | 41 | 42 | 47 | 47 | 47 |
| | Amount (part) | | 1.0 | 1.0 | 0.5 | 1.0 | 0.5 | 1.0 | 1.0 | 1.0 | 0.5 | 0.5 |
| | Kind | | 47 | 47 | 47 | | 46 | 47 | 47 | | 48 | 48 |
| | Amount (part) | | 1.0 | 1.0 | 1.0 | | 1.0 | 1.0 | 1.0 | | 0.5 | 0.5 |
| | Kind | | | | | | 49 | | | | | |
| | Amount (part) | | | | | | 0.5 | | | | | |
| Component (e) | Kind | 54 | 54 | 54 | 54 | 54 | 54 | 54 | 54 | 54 | 54 | 54 |
| | Amount (part) | 0.5 | 0.5 | 0.5 | 0.5 | 0.5 | 0.5 | 0.5 | 0.5 | 0.5 | 0.5 | 0.5 |
| | Kind | | | | 52 | 53 | | | | 31 | | 35 |
| | Amount (part) | | | | 0.5 | 0.5 | | | | 0.5 | | 0.5 |
| | Kind | | | | | | | | | | | |
| | Amount (part) | | | | | | | | | | | |
| Component (f) | Kind | 61 | 61 | 61 | 62 | 62 | 62 | 61 | 61 | 61 | | 61 |
| | Amount (part) | 2 | 2 | 2.5 | 2.5 | 2.5 | 1.0 | 1.0 | 1.0 | 25. | | 3 |
| Flame retarding property | | 22 | 38 | 32 | 35 | 38 | 33 | 32 | 30 | 34 | 50 | 48 |
| Remarks | | X | O | O | O | O | O | O | O | O | O | O |

EXAMPLE 30 AND COMPARATIVE EXAMPLE 5

As the resin base material, chlorinated polyethylene ("Elaslen 401 AE" manufactured by Showa Denko K.K.; chlorine content, 40%) is employed. The following components are mixed by a roll mill to prepare a basic composition (Basic Composition J):
Basic Composition J:
Chlorinated polyethylene: 100 parts
Stearic acid: 1 part
Complex stabilizer ("Stabinex MDC-1" manufactured by Mizusawa Kagaku Co., Ltd.): 5 parts To the basic composition J, the components shown in Table 4 are added, and the mixture is mixed by a roll mill and then press-cured at 165° C. for 30 minutes to obtain a sample having the same shape as in Examples 1 to 15. The results of the flammability test are shown in Table 4.

EXAMPLES 31 AND 32

As the resin base material, chlorosulfonated polyethylene ("Hiparon 40" manufactured by Du Pont) is employed. The following components are admixed by a roll mill to prepare a basic composition (Basic Composition K):
Basic Composition K:
Chlorosulfonated polyethylene: 100 parts
Stearic acid: 1 part
Microcrystalline wax: 2 parts
Dibenzothiazyl disulfide: 0.5 part
Dipentamethylenethiuram tetrasulfide: 0.7 part
Dibutyldithiocarbamate nickel salt: 3 parts
Lead oxide (PbO): 20 parts
Petrolatum: 3 parts To the basic composition K, the components shown in Table 4 are added, and the mixture is mixed by a roll mill and then press-cured at 165° C. for 30 minutes to obtain a sample having the same shape as in Examples 1 to 15. The results of the flammability test are shown in Table 4.

EXAMPLE 33

As the resin base material, chloroprene rubber ("Neoprene W" manufactured by Du Pont) is employed. The following components are admixed by a roll mill to prepare a basic composition (Basic Composition L):
Basic Composition L:
Neoprene rubber: 100 parts
Zinc oxide: 5 parts
Magnesia: 4 parts
Naphthene process oil: 10 parts
Stearic acid: 1 part
Microcrystalline wax: 2 parts
2-Mercaptoimidazoline: 0.7 part
Dibenzothiazyl disulfide: 0.5 part To the basic composition L, the components shown in Table 4 are added, and the mixture is mixed by a roll mill and then press-cured at 165° C. for 30 minutes to obtain a sample having the same shape as in Examples 1 to 15. The results of the flammability test are shown in Table 4.

EXAMPLE 34

As the resin base material, styrene-butadiene copolymer rubber ("SBR 1502" manufactured by Japan Synthetic Rubber Co., Ltd.; combined styrene, 23.5%) is employed. The following components are admixed by a roll mill to prepare a basic composition (Basic Composition M):
Basic Composition M:
Styrene-butadiene copolymer rubber: 100 parts
Zinc oxide: 10 parts
Stearic acid: 1 part To the basic composition M, the components shown in Table 4 are added, and the mixture is mixed by a roll mill and then press-cured at 165° C. for 30 minutes to obtain a sample having the same shape as in Examples 1 to 15. The results of the flammability test are shown in Table 4.

EXAMPLES 35 AND 36

As the resin base material, acrylonitrile-butadiene copolymer rubber ("N 230 SL" manufactured by Japan Synthetic Rubber Co., Ltd.; combined acrylonitrile, 35%) is employed. The following components are admixed by a roll mill to prepare a basic composition (Basic Composition N):

Basic Composition N:
Acrylonitrile-butadiene copolymer rubber: 100 parts
Zinc oxide: 10 parts
Stearic acid: 1 part To the basic composition N, the components shown in Table 4 are added, and the mixture is mixed by a roll mill and then press-cured at 165° C. for 30 minutes to obtain a sample having the same shape as in Examples 1 to 15. The results of the flammability test are shown in Table 4.

EXAMPLE 37

As the resin base material, natural rubber ("SMR 5L") is employed. The following components are admixed by a roll mill to prepare a basic composition (Basic Composition P):

Basic Composition P:
Natural rubber: 100 parts
Zinc oxide: 10 parts
Stearic acid: 1 part To the basic composition P, the components shown in Table 4 are added, and the mixture is mixed by a roll mill and then press-cured at 165° C. for 30 minutes to obtain a sample having the same shape as in Examples 1 to 15. The results of the flammability test are shown in Table 4.

EXAMPLE 38

As the resin base material, butyl rubber ("JST Butyl D-65" manufactured by Japan Synthetic Rubber Co., Ltd.) is employed. The following components are admixed by a roll mill to prepare a basic composition (Basic Composition Q):

Basic Composition Q:
Butyl rubber: 100 parts
Zinc oxide: 10 parts
Stearic acid: 1 part To the basic composition Q, the components shown in Table 4 are added, and the mixture is mixed by a roll mill and then press-cured at 165° C. for 30 minutes to obtain a sample having the same shape as in Examples 1 to 15. The results of the flammability test are shown in Table 4.

TABLE 4

|  |  | Comparative Example No. | Example No. | | | | | | | | |
|---|---|---|---|---|---|---|---|---|---|---|---|
|  |  | 5 | 30 | 31 | 32 | 33 | 34 | 35 | 36 | 37 | 38 |
| Basic composition |  | J | J | K | K | L | M | N | N | P | Q |
| Component (b) | Kind | 5 | 3 | 4 | 4 | 3 | 3 | 3 | 3 | 3 | 3 |
|  | Amount (part) | 30 | 5 | 20 | 20 | 30 | 30 | 30 | 30 | 30 | 30 |
|  | Kind |  | 4 | 6 | 5 | 8 | 9 | 10 | 11 | 12 | 13 |
|  | Amount (part) |  | 20 | 5 | 5 | 5 | 5 | 5 | 5 | 5 | 5 |
|  | Kind |  | 6 | 8 | 9 | 14 |  |  |  |  |  |
|  | Amount (part) |  | 15 | 10 | 10 | 5 |  |  |  |  |  |
|  | Kind |  |  |  |  |  |  |  |  |  |  |
|  | Amount (part) |  |  |  |  |  |  |  |  |  |  |
| Component (c) | Kind | 21 | 21 | 21 | 21 | 21 | 21 | 21 | 21 | 21 | 21 |
|  | Amount (part) | 10 | 10 | 10 | 10 | 10 | 10 | 10 | 10 | 10 | 10 |
|  | Kind | 31 | 31 | 30 | 30 | 27 | 27 | 28 | 28 | 30 | 30 |
|  | Amount (part) | 30 | 30 | 30 | 30 | 20 | 20 | 20 | 20 | 20 | 20 |
|  | Kind |  | 32 | 32 | 33 | 31 | 31 | 31 | 31 | 31 | 31 |
|  | Amount (part) |  | 5 | 5 | 5 | 30 | 30 | 30 | 30 | 30 | 30 |
|  | Kind |  |  |  |  | 34 | 34 | 29 | 29 | 29 | 29 |
|  | Amount (part) |  |  |  |  | 10 | 10 | 10 | 10 | 10 | 10 |
|  | Kind |  |  |  |  |  |  |  |  |  |  |
|  | Amount (part) |  |  |  |  |  |  |  |  |  |  |
| Component (d) | Kind |  | 47 | 47 | 47 | 47 | 47 | 47 | 47 | 47 | 47 |
|  | Amount (part) |  | 0.5 | 0.5 | 0.5 | 0.5 | 0.5 | 0.5 | 0.5 | 0.5 | 0.5 |
|  | Kind |  | 44 | 42 | 48 | 42 | 44 | 45 | 46 | 50 | 50 |
|  | Amount (part) |  | 0.5 | 0.5 | 0.5 | 0.5 | 0.5 | 0.5 | 0.5 | 0.5 | 0.5 |
|  | Kind |  |  |  |  |  |  |  |  |  |  |
|  | Amount (part) |  |  |  |  |  |  |  |  |  |  |
| Component (e) | Kind |  | 54 | 54 | 57 | 54 | 54 | 52 | 52 | 53 | 53 |
|  | Amount (part) |  | 0.5 | 0.5 | 0.5 | 0.5 | 0.5 | 0.5 | 0.5 | 0.5 | 0.5 |
|  | Kind |  |  |  |  |  |  | 53 |  | 56 | 56 |
|  | Amount (part) |  |  |  |  |  |  | 0.5 |  | 0.5 | 0.5 |
|  | Kind |  |  |  |  |  |  |  |  |  |  |

TABLE 4-continued

|  |  | Comparative Example No. | Example No. | | | | | | | | |
|---|---|---|---|---|---|---|---|---|---|---|---|
|  |  | 5 | 30 | 31 | 32 | 33 | 34 | 35 | 36 | 37 | 38 |
| Component (f) | Kind | 61 | 61 |  | 62 | 61 | 61 | 61 | 62 | 62 | 62 |
|  | Amount (part) | 2.0 | 2.0 | 3.0 | 1.0 | 1.0 | 1.0 | 1.0 | 1.0 | 1.0 | 1.0 |
| Flame retarding property |  | 30 | 51 | 47 | 49 | 48 | 29 | 34 | 36 | 28 | 27 |
| Remarks |  | X | O | O | O | O | O | O | O | O | O |

POSSIBILITY FOR INDUSTRIAL UTILIZATION

As apparent from the above description, blending of an organic high polymer with specific chemical substances according to the invention can afford to the high polymer a more excellent flame retarding property than conventional known methods do. Namely, the present invention provides an organic high polymer composition having an extremely high flame retarding property and is thus applicable for production of various molded products having an excellent flame resistivity.

What is claimed is:

1. An ethylenically unsaturated monomer-derived organic high polymer composition having an improved flame retarding property which comprises a flame resistive composition comprising (a) an ethylenically unsaturated monomer-derived hydrocarbon polymer, (b) a halogen-containing and/or phosphorus-containing organic flame retardant and (c) incombustible active inorganic powder in a mixing ratio: (a):(b):(c)=100:5-100:-10-300 by weight and as supplemental components to be added thereto (d) a polyfunctional compound having at least two ethylenically unsaturated groups and a molecular weight of 100 to 10,000 which polyfunctional compound is selected from the group consisting of (1) Aromatic polyfunctional compounds selected from the group consisting of divinyl-benzene, diallyl phthalate, diallyl isophthalate, 4,4'-isopropylidene diphenol bis(diethylene glycol methacrylate) ether, triallyl trimellitate and 2,2'-bis(4-acryloxydiethoxy-phenyl)propane (2) Aliphatic polyfunctional compound selected from the group consisting of syn-1-2-polybutadiene, 1,4,-butylene dimethacrylate, 1,4-anediol diacrylate, pentaerythritol triacrylate, N,N-methylene-bisacrylamide, ethylene glycol dimethacrylate, neopentyl glycol dimethacrylate, 1,3-butylene glycol dimethacrylate, polyethylene glycol dimethacrylate, trimethylolpropane trimethacrylate, pentaerythritol tetramethacrylate, 1,6-hexanediol diacrylate, trimethylolpropane triacrylate, diethyleneglycol dimethacrylate, triethylene glycol dimethacrylate, dipropylene glycol dimethacrylate, polyethylene glycol diacrylate, 1,6-hexanediol dimethacrylate and tetraethylene glycol dimethacrylate (3) Aliphatic polyfunctional cyclic compound selected from the group consisting of triallyl isocyanurate, triallyl cyanurate, triacryloylhexahydro-1,3,5-triazine and diallyl chlorendate and (4) Metal-containing polyfunctional compounds selected from the group consisting of aluminum acrylate, aluminum methacrylate, zinc methacrylate, zinc acrylate, magnesium methacrylate, magnesium acrylate, calcium methacrylate, calcium acrylate, zirconium acrylate, and zirconium methacrylate, and (e) an organic compound selected from the group consisting of

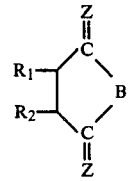

wherein $R_1$ and $R_2$ are each a hydrogen atom, a halogen atom or an organic group having not more than 30 carbon atoms, Z is an oxygen atom or a sulfur atom, and B is an oxygen atom or an imino group: —NY (Y being a hydrogen atom, a halogen atom or an organic group having not more than 30 carbon atoms) or its hydrolyzate;

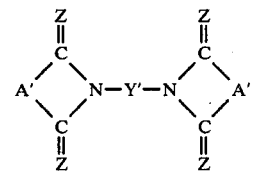

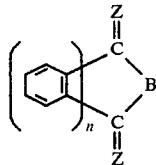

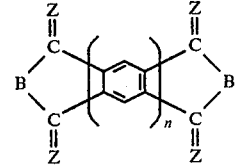

wherein A' is a substituted or unsubstituted divalent hydrocarbon group having a straight chain of 2 to 20 carbon atoms, Y' is a divalent hydrocarbon group having a straight chain of not larger than 20 carbon atoms, n is an integer of 1 to 3, and B and Z are as defined above, and benzene rings may bear substituents, each of the components (d) and (e) being added in an amount of at least 0.05 part by weight to 100 parts by weight of the component (a).

2. The composition according to claim 1 wherein an organic peroxide is further contained as the component (f), in addition to the components (a) to (e), in an amount of 0.3 to 20 parts by weight to 100 parts by weight of (a).

3. The composition according to claim 1 or 2 wherein at least one substance selected from the group consisting of organic high polymers being able to be cross-linked with an organic peroxide, polyvinyl chlorides, polychloroprenes and chlorohydrin rubbers is used as the component (a).

4. The composition according to claim 1 or 2 wherein the component (a) is an ethylene-propylene-diene terpolymer.

5. The composition according to claim 1 or 2 wherein the component (b) is a halogen-containing organic flame retardant.

6. The composition according to claim 5 wherein at least one of the halogen atoms of the said halogen-containing organic flame retardant is a bromine atom.

7. The composition according to claim 1 or 2 wherein the component (b) is a halogen and phosphorus-containing organic flame retardant.

8. The composition according to claim 7 wherein at least one of the halogen atoms of the said halogen and phosphorus-containing organic flame retardant is a bromine atom.

9. The composition according to claim 1 or 2 wherein the component (b) is a phosphorus-containing organic flame retardant.

10. The composition according to claim 1 or 2 wherein the component (c) is a magnesium-containing inorganic powder.

11. The composition according to claim 10 wherein at least one substance selected from the group consisting of magnesium silicate, hydrated magnesia, magnesium canbonate and basic magnesium carbonate is used as the said magnesium-containing inorganic powder.

12. The composition according to claim 1 or 2 wherein the component (c) is an inorganic flame retardant.

13. The composition according to claim 12 wherein at least one substance selected from the group consisting of antimony compounds, molybdenum compounds and zirconium compounds is used as the said inorganic flame retardant.

14. The composition according to claim 1 or 2 wherein at least one substance selected from the group consisting of glass, silicic acid, clay, hydrated alumina, asbestos, mica and calcium carbonate is used as the component (c).

15. The composition according to claim 1 or 2 wherein the component (d) is a nitrogen-containing polyfunctional cyclic compound.

16. The composition according to claim 15 wherein at least one substance selected from the group consisting of triallyl isocyanurate, triallyl cyanurate and 1,3,5-triacryloyl hexahydro-1,3,5-triazine is used as the said nitrogen-containing polyfunctional cyclic compound.

17. The composition according to claim 1 or 2 wherein at least one substance selected from the group consisting of N,N'-m-phenylenebismaleimide, terpinene maleic anhydride, N-(cyclohexylthio)phthalimide, pyromellitic anhydride, phthalic anhydride, maleic anhydride and maleic terpinene imide is used as the component (e).

18. The composition according to claim 1 or 2 wherein at least one substance selected from the group consisting of decabromodiphenyl ether, decabromobiphenyl and tetrabromobisphenol S is used as the component (b), at least one substance selected from the group consisting of magnesium silicate and antimony trioxide is used as the component (c), the component (d) is triallyl isocyanurate and the component (e) is N,N'-m-phenylene bismaleimide.

19. A cured product obtained by curing the composition according to claim 1.

20. The cured product according to claim 19, wherein the curing is effected by the use of a curing agent.

21. The cured product according to claim 19, wherein the curing is effected by irradiation.

* * * * *